(12) United States Patent
Wang

(10) Patent No.: US 10,477,431 B2
(45) Date of Patent: Nov. 12, 2019

(54) METHOD AND APPARATUS FOR DETERMINING SIGNAL-TO-NOISE RATIO IN WIRELESS COMMUNICATION

(71) Applicant: Huawei Technologies Co., Ltd., Shenzhen (CN)

(72) Inventor: Hao Wang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 147 days.

(21) Appl. No.: 15/667,192

(22) Filed: Aug. 2, 2017

(65) Prior Publication Data

US 2017/0347289 A1 Nov. 30, 2017

Related U.S. Application Data

(63) Continuation of application No. PCT/CN2015/082582, filed on Jun. 27, 2015.

(51) Int. Cl.
*H04W 72/12* (2009.01)
*H04W 28/04* (2009.01)
(Continued)

(52) U.S. Cl.
CPC ............ *H04W 28/04* (2013.01); *H04B 17/21* (2015.01); *H04B 17/336* (2015.01); *H04W 72/12* (2013.01)

(58) Field of Classification Search
CPC .. H04B 7/0413; H04B 7/0456; H04B 7/0632; H04B 7/066; H04B 7/068; H04B 7/0671;
(Continued)

(56) References Cited

U.S. PATENT DOCUMENTS 6,292,519 B1* 9/2001 Popovic .................... H04L 1/20
375/130
8,320,835 B2* 11/2012 Wei ...................... H04B 7/0621
375/132
(Continued)

FOREIGN PATENT DOCUMENTS

CN 1292953 A 4/2001
CN 101640572 A 2/2010
(Continued)

OTHER PUBLICATIONS

Jiang et al, Average Effective SNR Mapping in LTE-A Uplink, IEEE, 5 pages, 2012.*

(Continued)

*Primary Examiner* — Frank Duong
(74) *Attorney, Agent, or Firm* — Slater Matsil, LLP

(57) ABSTRACT

Relating to the field of wireless communications, a method and an apparatus for determining a signal-to-noise ratio in wireless communication are provided. The method includes: determining an effective signal-to-noise ratio of a received signal of current user equipment in the wireless communication; acquiring at least one parameter used to correct the effective signal-to-noise ratio; and determining, based on a mapping relationship used to correct the effective signal-to-noise ratio, a corrected signal-to-noise ratio corresponding to the at least one parameter and the effective signal-to-noise ratio.

14 Claims, 6 Drawing Sheets

(51) Int. Cl.
*H04B 17/21* (2015.01)
*H04B 17/336* (2015.01)

(58) Field of Classification Search
CPC .. H04B 7/0673; H04B 7/0678; H04B 7/0691; H04B 17/21; H04B 17/336; H04L 1/0026; H04L 1/0029; H04L 1/0036; H04L 1/06; H04L 5/0023; H04W 5/0023; H04W 28/04; H04W 28/048; H04W 72/12

See application file for complete search history.

(56) References Cited

U.S. PATENT DOCUMENTS

| | | | | |
|---|---|---|---|---|
| 8,644,262 | B1 * | 2/2014 | Sun | H04B 17/336 370/267 |
| 8,761,039 | B2 * | 6/2014 | Ji | H04B 7/0632 370/252 |
| 8,953,726 | B2 * | 2/2015 | Chen | H04B 7/0814 375/347 |
| 9,451,625 | B2 * | 9/2016 | Jongren | H04L 1/0026 |
| 9,673,957 | B2 * | 6/2017 | Jongren | H04L 5/0073 |
| 9,872,302 | B2 * | 1/2018 | Jongren | H04L 1/0026 |
| 10,003,486 | B2 * | 6/2018 | Zhu | H04L 27/2627 |
| 2005/0272373 | A1 | 12/2005 | Murase | |
| 2012/0099634 | A1 | 4/2012 | Maruyama et al. | |
| 2013/0258877 | A1 | 10/2013 | Ji et al. | |
| 2014/0128115 | A1 | 5/2014 | Siomina et al. | |

FOREIGN PATENT DOCUMENTS

| | | |
|---|---|---|
| CN | 102395187 A | 3/2012 |
| CN | 102457337 A | 5/2012 |
| CN | 103997473 A | 8/2014 |
| CN | 104126278 A | 10/2014 |
| EP | 2247006 A1 | 11/2010 |
| EP | 2662999 A1 | 11/2013 |
| WO | 9946869 A1 | 9/1999 |
| WO | 2013154472 A1 | 10/2013 |

OTHER PUBLICATIONS

Oborina et al, Efficient Computation of Effective SINR, IEEE, 6 pages, 2012.*
Li et al, A Effective SINR Link to System Mapping Method for CQI Feedback in TD-LTE System, IEEE, 4 pages, 2011.*
Sano et al, Investigation on Feedback Channel State Information for Interference Rejection Combining Receiver in LTE-Advanced Downlink, IEEE, 6 pages, 2014.*

* cited by examiner

Table 1

| Input 1 | Input 2 | Correction result |
|---|---|---|
| Algorithm 1 | Effective signal-to-noise ratio 1 | Correction result 1 |
| | Effective signal-to-noise ratio 2 | Correction result 2 |
| | ⋮ | ⋮ |
| Algorithm 2 | Effective signal-to-noise ratio 1 | Correction result x |
| | Effective signal-to-noise ratio 2 | Correction result x+1 |
| | ⋮ | ⋮ |
| ⋮ | ⋮ | ⋮ |
| Algorithm n | Effective signal-to-noise ratio 1 | Correction result y |
| | Effective signal-to-noise ratio 2 | Correction result y+1 |
| | ⋮ | ⋮ |

FIG. 5

Table 2

| Input 1 | Input 2 | Input 3 | Input 4 | Input 5 | Correction result |
|---|---|---|---|---|---|
| Algorithm 1 | Effective signal-to-noise ratio 1 | Transmission mode 1 of an interference signal | Modulation and coding scheme 1 of the interference signal | Rank 1 of the interference signal | Correction result 1 |
| | | Transmission mode 2 of the interference signal | Modulation and coding scheme 2 of the interference signal | Rank 2 of the interference signal | Correction result 2 |
| Algorithm 2 | Effective signal-to-noise ratio 2 | | | | |

FIG. 6

METHOD AND APPARATUS FOR DETERMINING SIGNAL-TO-NOISE RATIO IN WIRELESS COMMUNICATION

CROSS-REFERENCE TO RELATED APPLICATIONS

This application is a continuation of International Application No. PCT/CN2015/082582, filed on Jun. 27, 2015, which is hereby incorporated by reference in its entirety.

TECHNICAL FIELD

The present invention relates to the field of wireless communications technologies, and in particular, to a method and an apparatus for determining a signal-to-noise ratio in wireless communication.

BACKGROUND

To improve the development of wireless communications technologies, a Long Term Evolution (LTE) project is set up by the 3rd Generation Partnership Project (3GPP). Multiple-input multiple-output (MIMO) and orthogonal frequency division multiplexing (OFDM) are the two most crucial technologies in the LTE project. In an actual LTE application scenario, a neighboring cell may interfere with user equipment (UE), and the interference may severely affect performance of demodulating data by the UE. In addition, in an MU-MIMO (multi-user MIMO) system, a specific scheduling mechanism may be used to select UEs that meet a requirement and group the UEs into a group, and antennas of multiple UEs in one group constitute a virtual multi-antenna array. A base station and multiple UEs in the group may send and receive data on a same time-frequency resource, the group of UEs are referred to as paired UEs, and interference may exist between the paired UEs. Using FIG. 1 as an example, a serving base station 11 may be an eNodeB, and provides a service for multiple UEs, such as UE 121, UE 122, and UE 123, in a serving cell 110. The UE 121 is close to an edge of the cell 110, and is subjected to interference from a cell 130 formed by another base station 13, and this is also called inter-cell interference, that is, a communications link 131 between the another base station 13 and the UE 121 is an interference link of a communications link in between the serving base station 11 and the UE 121. The UE 122 and the UE 123 are paired UEs, when the serving base station 11 performs MU-MIMO transmission to the UE 122 and the UE 123, interference may also exist between the UE 122 and the UE 123, that is, a communications link 112 between the UE 122 and the serving base station 11 and a communications link 113 between the UE 123 and the serving base station 11 interfere with each other. A link may also be considered as a channel.

The LTE project defines a standard receiver for rejecting interference in Release 11 (Release 11), for example, an interference rejection combining (IRC) receiver. However, a capability of rejecting inter-cell interference by the IRC is limited, and the IRC cannot reject interference between UEs well. Therefore, in LTE, a receiver having a stronger capability is defined in Release 12, for example, a symbol level interference cancellation (SLIC) receiver and a maximum likelihood (ML) receiver, to achieve a better interference rejection effect.

In an LTE system, a serving base station 11 may schedule appropriate radio resources, a modulation and coding scheme (MCS), Precoding Matrix Indicator (PMI), and a Rank Index (RI) for any UE, such as UE 121, according to channel state information (CSI) reported by the UE 121, to ensure normal communication of the UE 121. The UE 121 may calculate the CSI according to a minimum mean square error (MMSE) criterion, for which a received signal-to-noise ratio of the UE 121 needs to be calculated first, that is, a ratio of a valid signal to interference, the CSI is determined based on the signal-to-noise ratio, and the CSI is fed back to the base station 11. However, in a process of calculating the signal-to-noise ratio, the UE 121 does not consider inter-cell interference or interference between UEs; as a result, an obtained signal-to-noise ratio or obtained CSI is not accurate. Particularly, when the SLIC receiver or the ML receiver is used in the UE 121, the signal-to-noise ratio obtained by using the MMSE by means of calculation often cannot reflect an actual channel state of the UE, and therefore, inaccurate CSI is further obtained.

SUMMARY

Embodiments provide a method and an apparatus for determining a signal-to-noise ratio in wireless communication, so as to improve accuracy of a signal-to-noise ratio or CSI obtained by user equipment.

According to a first aspect, an embodiment provides a method for determining a signal-to-noise ratio in wireless communication. The method includes determining an effective signal-to-noise ratio of a received signal of current user equipment in the wireless communication. The method also includes acquiring at least one parameter used to correct the effective signal-to-noise ratio. The method also includes determining, based on a mapping relationship used to correct the effective signal-to-noise ratio, a corrected signal-to-noise ratio corresponding to the at least one parameter and the effective signal-to-noise ratio. Optionally, a minimum mean square error criterion may be used to determine the effective signal-to-noise ratio. Compared with a conventional minimum mean square error criterion algorithm, according to the method for determining a signal-to-noise ratio in wireless communication provided in this embodiment, an effective signal-to-noise ratio can be further corrected based on one or more parameters, and an obtained corrected signal-to-noise ratio more accurately reflects an actual channel state of user equipment.

According to the first aspect, in a first possible implementation manner of the first aspect, the mapping relationship used to correct the effective signal-to-noise ratio is a mapping formula, where the at least one parameter and the effective signal-to-noise ratio are inputs of the mapping formula, and the corrected signal-to-noise ratio is an output of the mapping formula.

According to the first aspect, in a second possible implementation manner of the first aspect, the mapping relationship used to correct the effective signal-to-noise ratio is a mapping table, where the mapping table is used to indicate the corrected signal-to-noise ratio corresponding to the at least one parameter and the effective signal-to-noise ratio. The mapping table includes a series of discrete values, so that the mapping table may be used to simplify complexity caused by calculation using a mapping formula.

According to the first aspect, the first possible implementation manner of the first aspect, or the second possible implementation manner of the first aspect, in a third possible implementation manner of the first aspect, the at least one parameter includes one or a combination of the following: a parameter indicating a receiver algorithm used by the current user equipment and a parameter of the at least one interference signal.

According to the first aspect, the first possible implementation manner of the first aspect, or the second possible implementation manner of the first aspect, in a fourth possible implementation manner of the first aspect, the at least one parameter includes a parameter indicating a receiver algorithm used by the current user equipment.

According to the fourth possible implementation manner of the first aspect, in a fifth possible implementation manner of the first aspect, the at least one parameter further includes parameters of N interference signals, where N is an integer that is greater than or equal to 2; and the determining, based on a mapping relationship used to correct the effective signal-to-noise ratio, a corrected signal-to-noise ratio corresponding to the at least one parameter and the effective signal-to-noise ratio includes: step 1: determining, based on the mapping relationship, a corrected signal-to-noise ratio corresponding to the parameter indicating the receiver algorithm used by the current user equipment, a parameter of an $i^{th}$ interference signal in the parameters of the N interference signals, and the effective signal-to-noise ratio; and step 2: replacing the effective signal-to-noise ratio with the corrected signal-to-noise ratio, adding 1 to a value of i, and repeating the step 1, until i=N, where i is an integer that is greater than or equal to 1 and that is less than or equal to N, and an initial value of i is 1. Influence caused by multiple interference signals can be eliminated by performing iterative processing multiple times, so that a finally obtained corrected signal-to-noise ratio is more accurate.

According to the third or the fifth possible implementation manner of the first aspect, in a sixth possible implementation manner of the first aspect, any interference signal in the at least one interference signal is caused by a neighboring cell of a serving cell of the current user equipment, or is caused by another user equipment in the serving cell, where the another user equipment is user equipment paired with the current user equipment in the serving cell.

According to the third, the fifth, or the sixth possible implementation manner of the first aspect, in a seventh possible implementation manner of the first aspect, a parameter of any interference signal in the at least one interference signal includes one or a combination of the following: a transmission mode of the interference signal, a rank of the interference signal, a data-to-pilot power ratio of the interference signal, and a modulation scheme of the interference signal. In a correction process, reference is made to various parameters about the interference signal, and correction processing is performed based on the parameters, so that a more accurate signal-to-noise ratio can be obtained.

According to the third or the fourth possible implementation manner of the first aspect, in an eighth possible implementation manner of the first aspect, the receiver algorithm is a symbol level interference cancellation algorithm or a maximum likelihood algorithm. In the correction process, reference is made to the receiver algorithm, and for different receiver algorithms, different corrected signal-to-noise ratios can be obtained, so that a calculation result is more accurate.

According to the first aspect or any manner of the first to the eighth possible implementation manners of the first aspect, in a ninth possible implementation manner of the first aspect, the method further includes: determining channel state information based on the corrected signal-to-noise ratio; and reporting the channel state information to a serving station of the current user equipment. According to the method, accuracy of the channel state information obtained based on the corrected signal-to-noise ratio is also further improved, thereby improving accuracy of a channel feedback.

According to the first aspect or any manner of the first to the ninth possible implementation manners of the first aspect, in a tenth possible implementation manner of the first aspect, the wireless communication is Long Term Evolution wireless communication.

According to a second aspect, an embodiment provides an apparatus for determining a signal-to-noise ratio in wireless communication. The apparatus includes an effective signal-to-noise ratio determining unit, configured to determine an effective signal-to-noise ratio of a received signal of current user equipment in the wireless communication. The apparatus also includes a parameter determining unit, configured to acquire at least one parameter used to correct the effective signal-to-noise ratio. The apparatus also includes a correction unit, configured to determine, based on a mapping relationship used to correct the effective signal-to-noise ratio, a corrected signal-to-noise ratio corresponding to the at least one parameter and the effective signal-to-noise ratio. Optionally, the apparatus may be located in the current user equipment. Optionally, a minimum mean square error criterion may be used to determine the effective signal-to-noise ratio.

According to the second aspect, in a first possible implementation manner of the second aspect, the mapping relationship used to correct the effective signal-to-noise ratio is a mapping formula, and the correction unit uses the mapping formula to calculate the corrected signal-to-noise ratio, where the at least one parameter and the effective signal-to-noise ratio are inputs of the mapping formula, and the corrected signal-to-noise ratio is an output of the mapping formula.

According to the second aspect, in a second possible implementation manner of the second aspect, the mapping relationship used to correct the effective signal-to-noise ratio is a mapping table, where the mapping table is used to indicate the corrected signal-to-noise ratio corresponding to the at least one parameter and the effective signal-to-noise ratio, and the correction unit obtains the corrected signal-to-noise ratio by using the mapping table.

According to the second aspect, the first possible implementation manner of the second aspect, or the second possible implementation manner of the second aspect, in a third possible implementation manner of the second aspect, the at least one parameter includes one or a combination of the following: a parameter indicating a receiver algorithm used by the current user equipment and a parameter of the at least one interference signal.

According to the second aspect, the first possible implementation manner of the second aspect, or the second possible implementation manner of the second aspect, in a fourth possible implementation manner of the second aspect, the at least one parameter includes a parameter indicating a receiver algorithm used by the current user equipment.

According to the fourth possible implementation manner of the second aspect, in a fifth possible implementation manner of the second aspect, the at least one parameter further includes parameters of N interference signals, where N is an integer that is greater than or equal to 2; and the correction unit is specifically configured to perform: step 1: determining, based on the mapping relationship, a corrected signal-to-noise ratio corresponding to the parameter indicating the receiver algorithm used by the current user equipment, a parameter of an $i^{th}$ interference signal in the parameters of the N interference signals, and the effective signal-to-noise ratio; and step 2: replacing the effective signal-to-noise ratio with the corrected signal-to-noise ratio, adding 1 to a value of i, and repeating the step 1, until i=N, where i is an integer that is greater than or equal to 1 and that is less than or equal to N, and an initial value of i is 1.

According to the third or the fifth possible implementation manner of the second aspect, in a sixth possible implementation manner of the second aspect, any interference signal in the at least one interference signal is caused by a neighboring cell of a serving cell of the current user equipment, or is caused by another user equipment in the serving cell, where the another user equipment is user equipment paired with the current user equipment in the serving cell.

According to the third, the fifth, or the sixth possible implementation manner of the second aspect, in a seventh possible implementation manner of the second aspect, a parameter of any interference signal in the at least one interference signal includes one or a combination of the following: a transmission mode of the interference signal, a rank of the interference signal, a data-to-pilot power ratio of the interference signal, and a modulation scheme of the interference signal.

According to the third or the fourth possible implementation manner of the second aspect, in an eighth possible implementation manner of the second aspect, the receiver algorithm is a symbol level interference cancellation algorithm or a maximum likelihood algorithm.

According to the second aspect or any manner of the first to the eighth possible implementation manners of the second aspect, in a ninth possible implementation manner of the second aspect, the apparatus further includes: a channel state information reporting unit, configured to determine channel state information based on the corrected signal-to-noise ratio; and report the channel state information to the serving station of the current user equipment.

According to the second aspect or any manner of the first to the ninth possible implementation manner of the second aspect, in a tenth possible implementation manner of the second aspect, the wireless communication is Long Term Evolution wireless communication.

According to a third aspect, an embodiment of the present invention provides user equipment for determining a signal-to-noise ratio in wireless communication, including: a memory, configured to store at least one parameter used to correct an effective signal-to-noise ratio; a processor, configured to determine the effective signal-to-noise ratio of a received signal of the user equipment, acquire the at least one parameter from the memory, and determine, based on a mapping relationship used to correct the effective signal-to-noise ratio, a corrected signal-to-noise ratio corresponding to the at least one parameter and the effective signal-to-noise ratio. Optionally, a minimum mean square error criterion may be used to determine the effective signal-to-noise ratio.

According to the third aspect, in a first possible implementation manner of the third aspect, the mapping relationship used to correct the effective signal-to-noise ratio is a mapping formula, and the processor is further configured to calculate the corrected signal-to-noise ratio by using the mapping formula, where the at least one parameter and the effective signal-to-noise ratio are inputs of the mapping formula, and the corrected signal-to-noise ratio is an output of the mapping formula.

According to the third aspect, in a second possible implementation manner of the third aspect, the mapping relationship used to correct the effective signal-to-noise ratio is a mapping table, where the mapping table is used to indicate the corrected signal-to-noise ratio corresponding to the at least one parameter and the effective signal-to-noise ratio; and the processor is further configured to obtain the corrected signal-to-noise ratio by using the mapping table.

According to the third aspect, the first possible implementation manner of the third aspect, or the second possible implementation manner of the third aspect, in a third possible implementation manner of the third aspect, the at least one parameter includes one or a combination of the following: a parameter indicating a receiver algorithm used by the user equipment and a parameter of the at least one interference signal.

According to the third aspect, the first possible implementation manner of the third aspect, or the second possible implementation manner of the third aspect, in a fourth possible implementation manner of the third aspect, the at least one parameter includes a parameter indicating a receiver algorithm used by the user equipment.

According to the fourth possible implementation manner of the third aspect, in a fifth possible implementation manner of the third aspect, the at least one parameter further includes parameters of N interference signals, where N is an integer that is greater than or equal to 2; and the processor is further configured to perform: step 1: determining, based on the mapping relationship, a corrected signal-to-noise ratio corresponding to the parameter indicating the receiver algorithm used by the user equipment, a parameter of an $i^{th}$ interference signal in the parameters of the N interference signals, and the effective signal-to-noise ratio; and step 2: replacing the effective signal-to-noise ratio with the corrected signal-to-noise ratio, adding 1 to a value of i, and repeating the step 1, until i=N, where i is an integer that is greater than or equal to 1 and that is less than or equal to N, and an initial value of i is 1.

According to the third or the fifth possible implementation manner of the third aspect, in a sixth possible implementation manner of the third aspect, any interference signal in the at least one interference signal is caused by a neighboring cell of a serving cell of the user equipment, or is caused by another user equipment in the serving cell, and the another user equipment is user equipment paired with the user equipment in the serving cell.

According to the third, the fifth, or the sixth possible implementation manner of the third aspect, in a seventh possible implementation manner of the third aspect, a parameter of any interference signal in the at least one interference signal includes one or a combination of the following: a transmission mode of the interference signal, a rank of the interference signal, a data-to-pilot power ratio of the interference signal, and a modulation scheme of the interference signal.

According to the third or the fourth possible implementation manner of the third aspect, in an eighth possible implementation manner of the third aspect, the receiver algorithm is a symbol level interference cancellation algorithm or a maximum likelihood algorithm.

According to the third aspect or any manner of the first to the eighth possible implementation manners of the third aspect, in a ninth possible implementation manner of the third aspect, the processor is further configured to: determine channel state information based on the corrected signal-to-noise ratio; and report the channel state information to a serving station of the user equipment. In a possible implementation manner, the step of reporting the channel state information to a serving station of the user equipment may be implemented by a processing unit in the processor, or the step of reporting the channel state information to a serving station of the user equipment may be implemented by a radio frequency apparatus in the processor.

According to the third aspect or any manner of the first to the ninth possible implementation manners of the third aspect, in a tenth possible implementation manner of the third aspect, the wireless communication is Long Term Evolution wireless communication.

The foregoing implementation manners may be used to correct an effective signal-to-noise ratio to obtain a signal-to-noise ratio with higher accuracy, so that channel state information with higher accuracy is obtained based on the corrected signal-to-noise ratio, thereby improving communication performance of a wireless communications system. The foregoing implementation manners may be used to improve a conventional minimum mean square error criterion algorithm, to achieve a better wireless communication effect.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention or the prior art, and a person of ordinary skill in the art may still derive other drawings from these accompanying drawings without creative efforts.

FIG. 5 is a brief schematic diagram of a mapping table for determining a signal-to-noise ratio in wireless communication according to an embodiment;

FIG. 6 is a brief schematic diagram of another mapping table for determining a signal-to-noise ratio in wireless communication according to an embodiment;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

In an embodiment, user equipment, that is, UE, is also referred to as a wireless terminal or a user terminal, which may enjoy a wireless access service of a serving station. The serving station is generally a base station, for example, an eNodeB or a NodeB in LTE, or may be an access point for connecting the user equipment to a mobile communications network, for example, a base station controller. When providing the access service for the user equipment, the serving station may form one or more cells, where a cell may cover a range geographically and occupies a carrier or a frequency band in a frequency domain. Specifically, the user equipment and the serving station may implement a communication process by running a wireless communications protocol, where the wireless communications protocol includes, without being limited to, various cellular wireless communications protocols, such as LTE, Global System for Mobile Communications (GSM), Universal Mobile Telecommunications System (UMTS), Worldwide Interoperability for Microwave Access (WiMAX), and Time Division-Synchronous Code Division Multiple Access (TDS-CDMA) or Code Division Multiple Access 2000 (CDMA2000). In the embodiments of the present invention, LTE is a more common application scenario.

When the user equipment communicates with the serving station, to feed back channel state information to the serving station, so as to schedule a resource and allocate a modulation and coding scheme and a precoding scheme based on the channel state information, the user equipment first needs to accurately estimate a signal-to-noise ratio of a received signal of the user equipment, where sometimes the signal-to-noise ratio may also be a signal to interference plus noise ratio (SINR). Therefore, a method, better than a conventional technique, for determining a signal-to-noise ratio in wireless communication is provided in this embodiment of the present invention.

Figure 1:
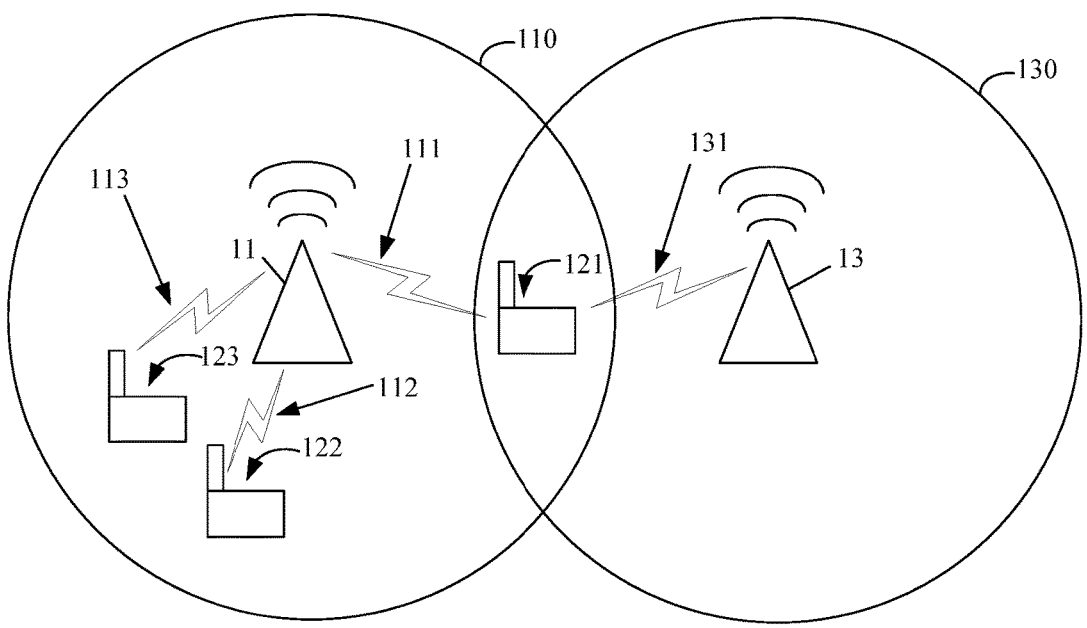
FIG. 1 is a brief schematic diagram of a principle of forming an interference signal in wireless communication according to the prior art.
Figure 2:
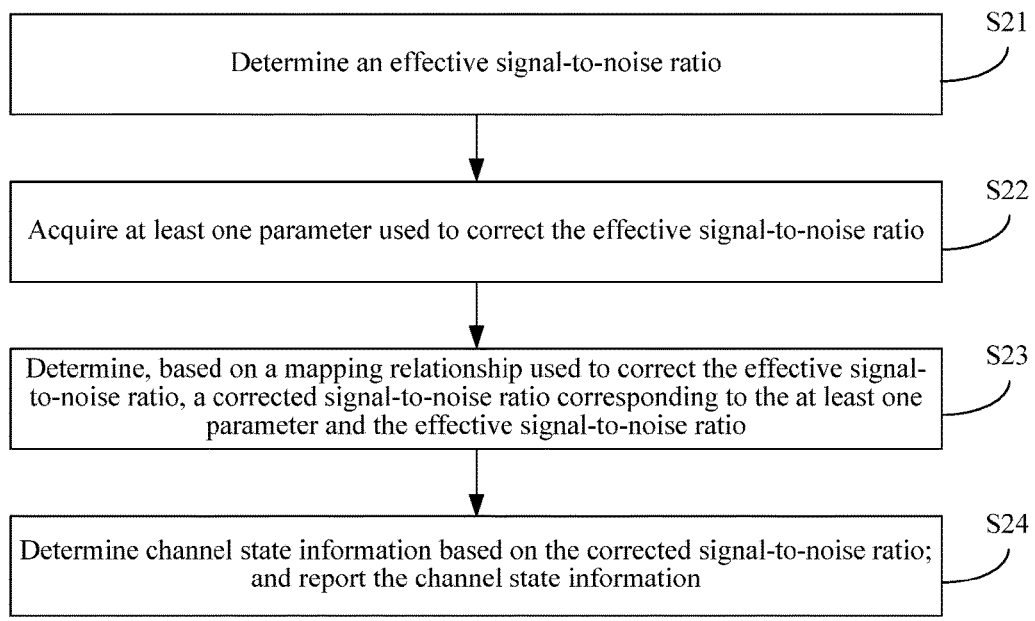
FIG. 2 is a brief schematic diagram of a method for determining a signal-to-noise ratio in wireless communication according to an embodiment.
Figure 3:
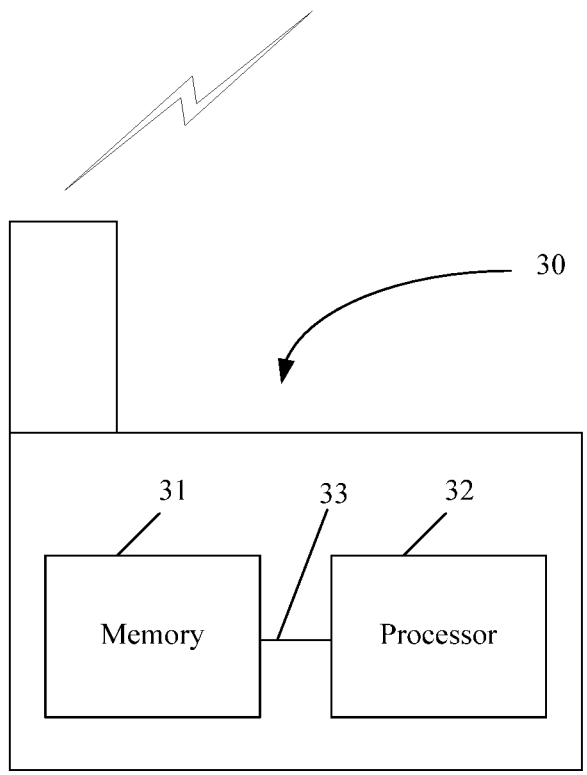
FIG. 3 is a brief schematic structural diagram of user equipment for determining a signal-to-noise ratio in wireless communication according to an embodiment.

FIG. 2 is a brief schematic diagram of an embodiment of the method, where the method may be executed by the user equipment 30, and can correct a conventional signal-to-noise ratio. Referring to FIG. 3, the user equipment 30 may include a memory 31 and a processor 32. The memory 31 and the processor 32 may be coupled by using a connection cable or a circuit interface 33. The processor 32 in the user equipment 30 may be configured to execute the method for determining a signal-to-noise ratio in this embodiment. Specifically, in S21, the user equipment 30 or the processor 32 may determine an effective signal-to-noise ratio of a received signal of the user equipment 30 in wireless communication based on a minimum mean square error criterion. The minimum mean square error criterion is a conventional technique for calculating an effective signal-to-noise ratio in wireless communication, and the implementation principle of the technique is described in many documents, which is not described in detail in this embodiment.

In S22, the user equipment 30 acquires at least one parameter used to correct the effective signal-to-noise ratio. The at least one parameter may be a group of parameters, that is, multiple parameters, which are used to correct the effective signal-to-noise ratio to obtain a more accurate signal-to-noise ratio. Specifically, the at least one parameter may be one or a combination of the following: a parameter indicating a receiver algorithm used by the current user equipment 30 and a parameter of at least one interference signal. The receiver algorithm may be a symbol level interference cancellation algorithm or a maximum likelihood algorithm, and certainly, another available receiver algorithm is not excluded. The used algorithm is used to implement good interference rejection in demodulating the received signal. In this embodiment, a parameter indicating a receiver algorithm is used as a reference factor to correct a signal-to-noise ratio. It is noted that the user equipment 30, when using different receiver algorithms, has different interference rejection capabilities, and accuracy of a signal-to-noise ratio obtained by the user equipment 30 can be improved by means of the correction.

As shown in FIG. 3, preferably, the at least one parameter may be stored in a memory 31 of the user equipment 30. The memory 31 may be a random access memory (RAM), a read-only memory (ROM), a flash memory, or the like, or may be an element for temporary or interim storage, such as a buffer, a FIFO (First In First Out), or a register, and a type of the memory 31 is not limited in this embodiment. In an example, the memory 31 may be a register. When performing correction processing, the processor 32 may specifically acquire the at least one parameter from the memory 31. The user equipment 30 updates the memory 31 during working in real time or at intervals according to a working state of the user equipment 30. For example, the processor 32 may learn the receiver algorithm currently used by the user equipment 30 and writes a parameter indicating the algorithm into the memory 31, so that the parameter is used when the correction processing is subsequently performed. In addition, the user equipment 30 may receive a parameter of at least one interference signal from a serving base station of the user equipment 30 or another network communications node and write the parameter into the memory 31, so that the parameter is used when the correction processing is subsequently performed.

In an implementation manner, a parameter of an interference signal may include a transmission mode of the interference signal, a rank of the interference signal, a data-to-pilot power ratio of the interference signal, or a modulation scheme of the interference signal. The user equipment 30 uses the parameter of the interference signal as a reference factor to correct a signal-to-noise ratio. It is noted that when transmission modes, ranks, or modulation schemes used by interference signals are different, interference to the user equipment 30 is also different, and accuracy of a signal-to-noise ratio calculated by the user equipment 30 can be improved by means of the correction. As described in the Background, the user equipment 30 may have multiple interference signals, and causes for forming the interference signals may be different. An interference signal may be caused by user equipment paired with the user equipment 30 in a serving cell of the current serving base station of the user equipment 30, or is caused by a neighboring cell of a neighboring base station, and a cause for forming an interference signal is not specifically limited in this embodiment.

In the foregoing implementation manner, the transmission mode of the interference signal may be a MIMO transmission mode of an interference signal from an interference cell, and may include a MIMO transmission mode, such as a transmit diversity, open-loop spatial multiplexing, closed-loop spatial multiplexing, or beamforming. The modulation scheme of the interference signal may include a modulation scheme for an interference signal, such as 16QAM (Quadrature Amplitude Modulation), 64QAM, or QPSK (Quadrature Phase Shift Keying). The data-to-pilot power ratio of the interference signal reflects a ratio of data signal power to pilot power of the interference signal, where the pilot may also be referred to as a reference signal, and may be used to perform channel estimation or measurement. The parameters about the transmission mode of the interference signal, the rank of the interference signal, or the modulation scheme of the interference signal may be obtained by means of estimation performed on the interference signal by the user equipment based on an existing interference estimation solution. That is, before S22, the user equipment 30 or the processor 32 of the user equipment 30 may obtain a parameter of the at least one interference signal by estimating an interference signal or an interference cell. Certainly, another manner for the user equipment 30 to acquire the parameter of the at least one interference signal is not excluded in this embodiment, for example, the user equipment 30 may obtain the parameters from another communications node, for example, a base station or another user equipment. For example, the user equipment 30 may specifically receive the parameter of the at least one interference signal through a physical downlink control channel (PDCCH) of the serving base station. After obtaining the parameters, the user equipment 30 or the processor 32 of the user equipment 30 may write the parameter of the at least one interference signal into the memory 31, so that the processor 32 in the user equipment 30 read the parameter in the memory 31 in the subsequent step S22.

In S23, the user equipment 30 determines, based on a mapping relationship used to correct the effective signal-to-noise ratio, a corrected signal-to-noise ratio corresponding to the at least one parameter and the effective signal-to-noise ratio. Specifically, the processor 32 may obtain the corrected signal-to-noise ratio by means of calculation based on a mapping formula or by means of looking up a mapping table.

In an implementation manner, the mapping relationship used to correct the effective signal-to-noise ratio is a mapping formula, which may be specifically SNR=$f$ (SNR$_{no}$, $\{\Phi\}$). SNR is the obtained corrected signal-to-noise ratio, SNR$_{no}$ is the effective signal-to-noise ratio, and $\{\Phi\}$ is a parameter set, including the at least one parameter. $f( )$ is a mapping function, representing the mapping relationship. The processor 32 may obtain, based on the mapping formula SNR=$f$ (SNR$_{no}$, $\{\Phi\}$), SNR by means of calculation by using SNR$_{no}$ and $\{\Phi\}$ as input variables. The mapping function $f( )$ may be preset, and may be stored in the memory 31 or another memory. That is, $f( )$ may be acquired in an offline manner. In this manner, before the user equipment determines the signal-to-noise ratio, an expression of $f( )$ is already pre-stored in the user equipment 30, so that implementation complexity is low. Specifically, $f( )$ may be obtained by a person skilled in the art by means of emulation. Before delivery of the user equipment 30, $f( )$ used as a parameter in a software code form is stored in the memory 31 or another memory, the processor 32 may acquire $f( )$ from the memory 31 or the another memory, and perform the correction processing based on $f( )$, to obtain a corrected signal-to-noise ratio. Alternatively, $f( )$ may be built in the processor 32, as a hardware circuit, that is, is made in the processor 32 by means of an integrated circuit or another circuit producing technique. When the processor 32 performs the correction processing, the mapping relationship $f( )$ is already stored in the processor 32, so that the processor 32 may directly calculate the corrected signal-to-noise ratio based on $f( )$. When the at least one parameter takes a different value, after the mapping of $f( )$, a value of the corrected signal-to-noise ratio obtained by the user equipment 30 or the processor 32 is different, so that an obtained signal-to-noise ratio is modified and improved according to an actual parameter of a receiver, thereby improving accuracy of the obtained signal-to-noise ratio. Regardless of whether $f( )$ is pre-stored in the memory 31 or another memory in a software form, or is built in the processor 32, as a hardware circuit, a person skilled in the art may obtain an appropriate function ƒ( ) by means of emulation and verification in development or production qualification of the user equipment 30.

In another implementation manner, the expression of ƒ( ) may be replaced with a search table or a mapping table including multiple discrete values. The mapping table is used to indicate the corrected signal-to-noise ratio corresponding to the at least one parameter and the effective signal-to-noise ratio, so as to replace ƒ( ) to indicate the mapping relationship mentioned above in this embodiment. The processor 32 is configured to obtain a corrected signal-to-noise ratio by using one or more parameters as an input to search the mapping table. The mapping table may be stored in the memory 31 or another memory in the software code form, and is read by the processor 32 from the memory 31. Alternatively, the mapping table may be built in the processor 32 in a logical circuit form. When the processor 32 performs the correction processing, the mapping table is already stored in the processor 32, so that the processor 32 may directly calculate a corrected signal-to-noise ratio based on the logical circuit reflecting the mapping table.

FIG. 5 is a schematic diagram of a mapping table 1 according to an embodiment. In the table 1, a parameter indicating a receiver algorithm is used as an input 1 of the table 1, and the table 1 includes a series of discrete values, for example, an algorithm 1 and an algorithm 2. Another input 2 is an effective signal-to-noise ratio, including multiple values, which respectively represent an effective signal-to-noise ratio 1, an effective signal-to-noise ratio 2, and so on. In this case, the mapping table 1 is equivalent to a two-dimensional search table, that is, a correction result is mapped by two inputs. The processor 32 uses the acquired parameter indicating the receiver algorithm and the obtained effective signal-to-noise ratio as two inputs, and finds a corresponding correction result from a table 2 as the corrected signal-to-noise ratio. For example, the algorithm 1 and the effective signal-to-noise ratio 1 correspond to a correction result 1, and the algorithm 2 and the effective signal-to-noise ratio 2 correspond to a correction result x+1.

As a quantity of introduced parameters used to perform correction is increased, a quantity of inputs in the mapping table is also increased. In the mapping table 2 shown in FIG. 6, in addition to using the effective signal-to-noise ratio and the parameter indicating the receiver algorithm as two inputs, three inputs may be further introduced, that is, a transmission mode of an interference signal, a rank of the interference signal, or a modulation scheme of the interference signal. In this way, the table 2 may be considered as a five-dimensional search table, including five inputs, that is, an effective signal-to-noise ratio and four parameters in a parameter set {Φ}, and the four parameters are respectively a parameter indicating a receiver algorithm, a transmission mode of an interference signal, a rank of the interference signal, and a modulation scheme of the interference signal. The processor 32 finds a corresponding correction result from the search table 2 as a corrected signal-to-noise ratio by using the five inputs. It should be understood that multiple mapping tables may be built in the user equipment 30, where the multiple mapping tables may be stored in the memory 31 or another memory in a software code form, or may be built in the processor 32 in a logical circuit form, and the user equipment 30 or the processor 32 may determine a mapping table in the multiple mapping tables to be used to determine the corrected signal-to-noise ratio. A quantity of inputs of each mapping table may be two or more, and the quantity of inputs specifically depends on parameters that are included in the parameter set {Φ} related to the mapping table.

Besides including one or multiple parameters listed in the table 2, the parameters may also further include another parameter affecting an interference characteristic, which is not limited in this embodiment. A larger quantity of used parameters indicates that more factors are considered in a correction process, and in this case, a signal-to-noise ratio obtained by means of correction is more accurate. Therefore, as the quantity of inputs of the mapping table is increased, a correction effect is improved.

For the user equipment 30, whether a quantity of interference signals is one or more than one depends on an actual use scenario of the user equipment 30 or a deployment status of wireless networks around the user equipment 30. When the quantity of interference signals is more than one, an effective signal-to-noise ratio may be corrected for each interference signal sequentially. Specifically, in step 23, the user equipment 30 or the processor 32 may have a capability of processing multiple interference signals. Specifically, the user equipment 30 first calculates an effective signal-to-noise ratio before correction, and then traverses all possible interference signals. If the correction processing needs to be performed on an $i^{th}$ interference signal, the mapping table or the mapping formula described in the foregoing embodiment are used to calculate an $i^{th}$ corrected signal-to-noise ratio. The $i^{th}$ corrected signal-to-noise ratio is used as an input for a next interference signal, that is, an $(i+1)^{th}$ interference signal during correction, where i is an integer that is greater than or equal to 1 and that is less than or equal to N, and an initial value of i is 1. After each iteration, 1 is added to a value of i, until i is equal to N. N is the quantity of interference signals, and is an integer that is greater than or equal to 2. That is, the processor 32 may calculate an effective signal-to-noise ratio in an iterative manner for a parameter of each interference signal, to improve system performance.

Figure 7:
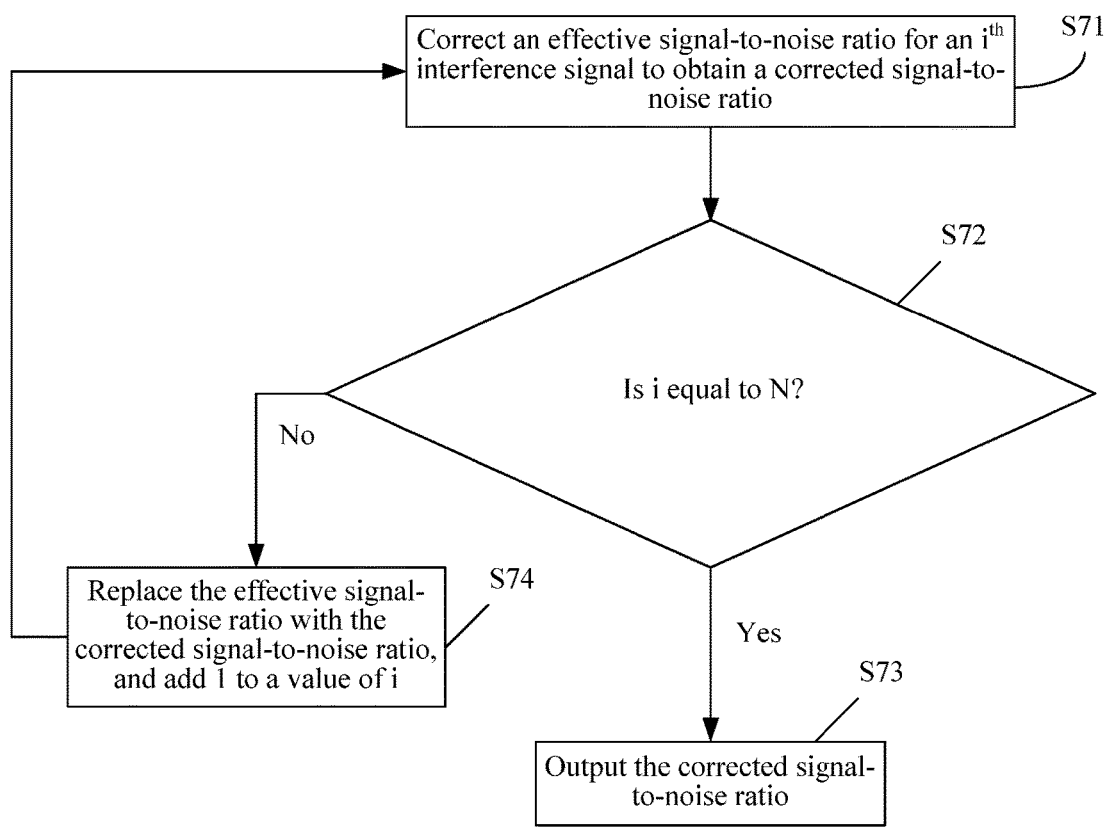
FIG. 7 is a brief schematic flowchart of sequentially correcting effective signal-to-noise ratios for multiple interference signals in an iterative manner according to an embodiment.

A specific iteration process of the foregoing method may be shown in FIG. 7. In S71, the processor 32 corrects an effective signal-to-noise ratio for the $i^{th}$ interference signal based on the mapping relationship, that is, the processor 32 determines, based on the mapping table or the mapping formula, a corrected signal-to-noise ratio corresponding to a parameter indicating a receiver algorithm used by the current user equipment, a parameter of the $i^{th}$ interference signal in parameters of N interference signals, and the effective signal-to-noise ratio. In S72, it is determined whether i is equal to N. If i is equal to N, in S73, the corrected signal-to-noise ratio is output as a final correction result. If i is less than N, S74 is performed, that is, replacing the effective signal-to-noise ratio with the corrected signal-to-noise ratio, adding 1 to the value of i, and going back to step S71. The correction is performed on the multiple interference signals, so that accuracy of a signal-to-noise ratio obtained by means of calculation may be further improved in this embodiment.

Optionally, the method for determining a signal-to-noise ratio may further include: in S24, the user equipment 30 or the processor 32 may determine channel state information based on the corrected signal-to-noise ratio obtained by means of calculation, and reports the channel state information to a serving station of the current user equipment 30. Channel state information reporting, that is, a step of channel feedback, is further added in the method for determining a signal-to-noise ratio, which is equivalent to providing a channel state information reporting or channel feedback method in this embodiment. In this case, the processor 32 may be further divided into a processing unit configured to determine channel state information and a radio frequency apparatus (not shown in FIG. 3) configured to report the channel state information. The radio frequency apparatus and the processing unit may be located in a same chip or separately located in different chips. The channel state information in this embodiment may include at least one of a rank index (RI), a precoding matrix indicator (PMI), or a channel quality indicator (CQI). The CQI may further include a broadband CQI or a narrowband CQI, and the PMI may also further include a broadband PMI or a narrowband PMI, which is not limited in this embodiment. Because the channel state information is obtained based on the corrected signal-to-noise ratio, an actual state of a channel used by the user equipment 30 in the wireless communication can be more accurately reflected. The serving base station also performs scheduling more accurately based on the channel state information fed back by the user equipment 30, so as to improve a data throughput of the user equipment 30, thereby improving overall performance of a wireless communications system.

In an embodiment shown in FIG. 3, the processor 32 may be specifically a communications processor, a baseband and radio frequency processor, a universal processing unit, or a wireless modem, and may be configured to run any one of wireless communications protocols, such as LTE, UMTS, or GSM. The processor 32 may be driven by necessary driver software to work. The driver software may be stored in the memory 31 or another storage unit. The driver software may be necessary protocol software that runs the foregoing wireless communications protocol. The processor 32 may include one or more chips, or the processor 32 may be implemented by using an integrated circuit or a circuit in another form, for example, a printed circuit, or a combination of the two. The integrated circuit is a circuit form that is manufactured on a semiconductor substrate by using an integrated circuit manufacturing process, and may include at least one of a digital circuit or an analog circuit. A chip includes a great quantity of integrated circuits and a peripheral packaging component.

Figure 4:
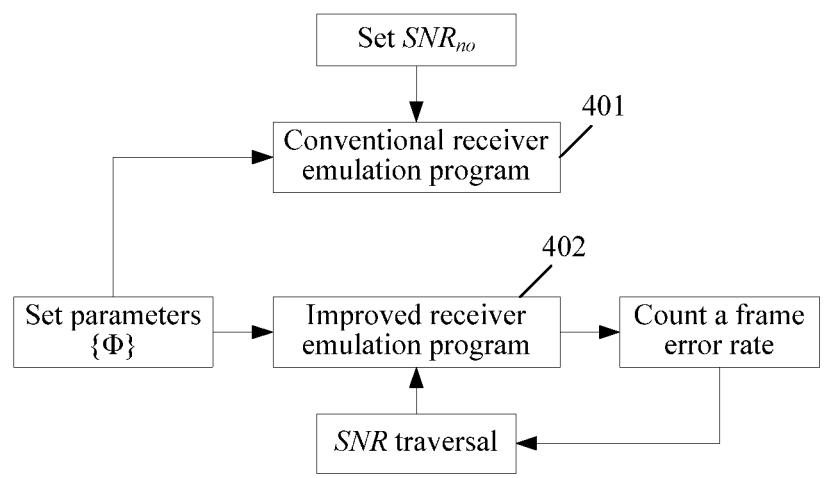
FIG. 4 is a brief schematic diagram of a method for acquiring a mapping function according to an embodiment.

The following provides a method example for a mapping relationship in this embodiment. A person skilled in the art may obtain the mapping relationship mentioned in this embodiment in a manner shown in FIG. 4 in development or production qualification of the user equipment 30. A person skilled in the art may construct a conventional receiver emulation program 401 and an improved receiver emulation program 402 by means of a computer emulation environment. The conventional receiver emulation program 401 is used to emulate a signal-to-noise ratio calculation method in a receiver in the prior art, and the improved receiver emulation program is used to emulate the method provided in this embodiment of the present invention. A group of parameters the same as the parameters $\{\Phi\}$ described in the foregoing embodiment may be set for the two programs 401 and 402. An initial signal-to-noise ratio of the conventional receiver emulation program 401, that is, $SNR_{no}$ described in the foregoing embodiment, is set to a value, so that a receive accuracy ratio, for example, a frame error rate, of the conventional receiver emulation program 401 at the signal-to-noise ratio reaches a preset value, for example, 10%. For the improved receiver emulation program 402, all possible SNR values are traversed and the values are sequentially configured for the improved receiver emulation program 402, and for each SNR value, a receive accuracy rate, for example, a frame error rate, of the improved receiver emulation program 402 is calculated. By means of traversal and iteration, until the receive accuracy rate of the improved receiver emulation program 402 reaches the preset value, in this case, an SNR value input into the improved receiver emulation program 402 is a corrected value of $SNR_{no}$ in the groups of parameters $\{\Phi\}$. That is, for different groups of parameters $\{\Phi\}$, correspondences between multiple discrete $SNR_{no}$ values and multiple discrete SNR values may be obtained in the foregoing manner, so as to form the mapping table described above. As described above, the mapping table reflecting the correspondences between the multiple discrete values may also be converted into an $f(\ )$ function, that is, a person skilled in the art may select an appropriate $f(\ )$ function by using a function fitting method to simulate actual correspondences between multiple discrete values. For how the fitting is performed, there is already relatively common application in the field of mathematics and computer science, which is not described in detail herein.

Figure 8:
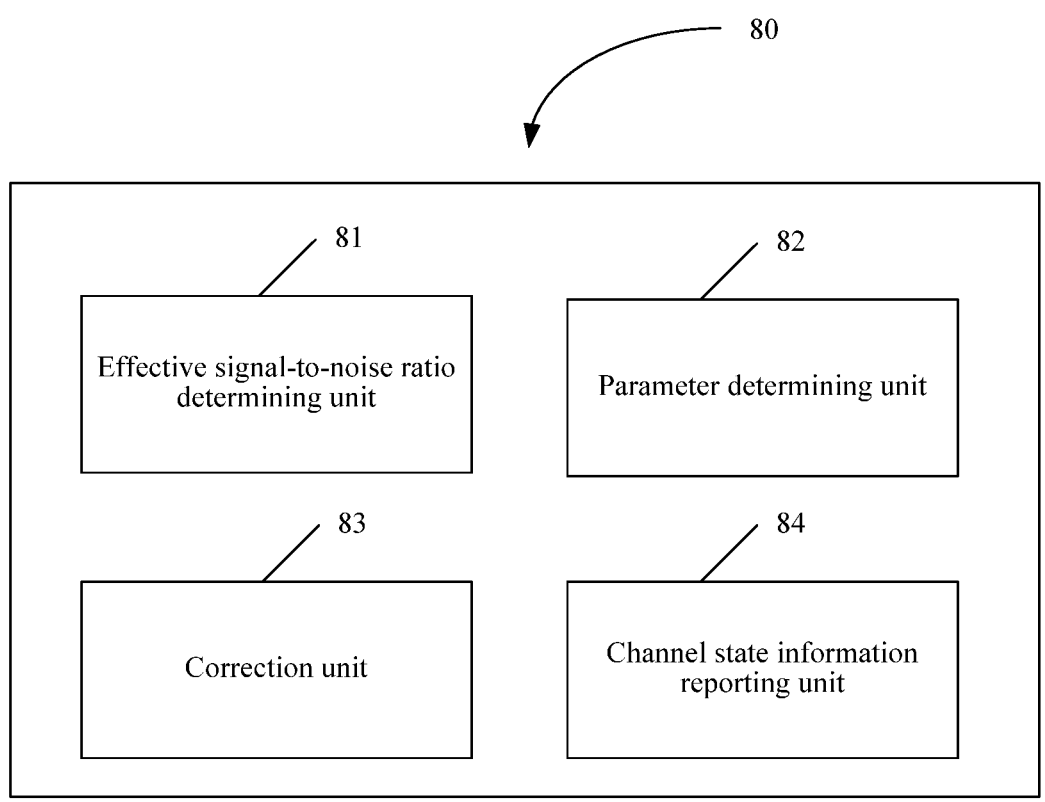
FIG. 8 is a brief schematic diagram of an apparatus for determining a signal-to-noise ratio in wireless communication according to an embodiment.

FIG. 8 is a schematic diagram of an apparatus 80 for determining a signal-to-noise ratio in wireless communication according to an embodiment of the present invention, which may be located in user equipment, and is configured to correct an effective signal-to-noise ratio. The apparatus 80 may include: an effective signal-to-noise ratio determining unit 81, configured to determine an effective signal-to-noise ratio of a received signal of the current user equipment in the wireless communication based on a minimum mean square error criterion; a parameter determining unit 82, configured to acquire at least one parameter of the effective signal-to-noise ratio; and a correction unit 83, configured to determine, based on a mapping relationship used to correct the effective signal-to-noise ratio, a corrected signal-to-noise ratio corresponding to the at least one parameter and the effective signal-to-noise ratio. Optionally, the apparatus 80 may further include: a channel state information reporting unit 84, configured to determine channel state information based on the corrected signal-to-noise ratio, and report the channel state information to a serving station of the current user equipment. For a specific corresponding step performed by each unit in the units, reference may be made to descriptions in the foregoing method embodiment, which is not described in detail herein again.

A person of ordinary skill in the art may understand that all or some of the processes of the methods in the embodiments may be implemented by a computer program instructing relevant hardware, such as a computer processor. The computer program may be stored in a computer readable storage medium. When the program runs, the processes of the methods in the embodiments are performed. The computer readable storage medium may be a magnetic disk, an optical disc, a ROM, a RAM, or the like.

The foregoing are merely exemplary embodiments of the present invention. A person skilled in the art may make various modifications and variations to the present invention without departing from the spirit and scope of the present invention. For example, specific shapes or structures of components in the accompanying drawings in the embodiments of the present invention may be adjusted according to an actual application scenario.

What is claimed is:
1. A method, comprising:
   determining an effective signal-to-noise ratio of a received signal of current user equipment in a wireless communication;
   acquiring a first parameter used to correct the effective signal-to-noise ratio, wherein the first parameter comprises: a second parameter indicating a receiver algorithm used by the current user equipment and a third parameter of an interference signal;

determining, based on a mapping relationship for correcting the effective signal-to-noise ratio, a corrected signal-to-noise ratio corresponding to the first parameter and the effective signal-to-noise ratio;

determining channel state information based on the corrected signal-to-noise ratio; and reporting the channel state information to a serving station of the current user equipment, to cause the serving station to communicate with the user equipment based on the channel state information.

2. The method according to claim 1, wherein the mapping relationship for correcting the effective signal-to-noise ratio is a mapping formula, wherein the first parameter and the effective signal-to-noise ratio are inputs of the mapping formula, and the corrected signal-to-noise ratio is an output of the mapping formula.

3. The method according to claim 1, wherein the mapping relationship for correcting the effective signal-to-noise ratio is a mapping table, and wherein the mapping table indicates the corrected signal-to-noise ratio corresponding to the first parameter and the effective signal-to-noise ratio.

4. The method according to claim 1, wherein the first parameter further comprises third parameters of N interference signals, wherein N is an integer that is greater than or equal to 2; and wherein determining the corrected signal-to-noise ratio corresponding to the first parameter and the effective signal-to-noise ratio comprises:

determining, based on the mapping relationship, a corrected signal-to-noise ratio corresponding to the second parameter indicating the receiver algorithm used by the current user equipment, a third parameter of an $i^{th}$ interference signal in the parameters of the N interference signals, and the effective signal-to-noise ratio; and replacing the effective signal-to-noise ratio with the corrected signal-to-noise ratio, adding 1 to a value of i, and repeating the determining of the corrected signal-to-noise ratio, the third parameter of the $i^{th}$ interference signal, and the effective signal-to-noise ratio, until i=N, wherein i is an integer and an initial value of i is 1.

5. The method according to claim 1, wherein the interference signal is caused by a neighboring cell of a serving cell of the current user equipment, or is caused by another user equipment in the serving cell, wherein the another user equipment is user equipment paired with the current user equipment in the serving cell.

6. The method according to claim 1, wherein the third parameter of the interference signal comprises one or a combination of the following: a transmission mode of the interference signal, a rank of the interference signal, a data-to-pilot power ratio of the interference signal, and a modulation scheme of the interference signal.

7. The method according to claim 1, wherein the receiver algorithm is a symbol level interference cancellation algorithm or a maximum likelihood algorithm.

8. An apparatus, comprising:

a memory, configured to store a first parameter for correcting an effective signal-to-noise ratio of a received signal of current user equipment in a wireless communication, wherein the first parameter comprises: a second parameter indicating a receiver algorithm used by the current user equipment and a third parameter of an interference signal;

a processor, configured to:

determine the effective signal-to-noise ratio;

acquire the first parameter from the memory;

determine, based on a mapping relationship for correcting the effective signal-to-noise ratio, a corrected signal-to-noise ratio corresponding to the first parameter and the effective signal-to-noise ratio;

determine channel state information based on the corrected signal-to-noise ratio; and report the channel state information to a serving station of the current user equipment, to cause the serving station to communicate with the user equipment based on the channel state information.

9. The apparatus according to claim 8, wherein the first parameter further comprises third parameters of N interference signals, wherein N is an integer that is greater than or equal to 2; and the processor is further configured to:

determine, based on the mapping relationship, a corrected signal-to-noise ratio corresponding to the second parameter indicating the receiver algorithm used by the current user equipment, a third parameter of an $i^{th}$ interference signal in the parameters of the N interference signals, and the effective signal-to-noise ratio; and replace the effective signal-to-noise ratio with the corrected signal-to-noise ratio, add 1 to a value of i, and repeat the determining of the corrected signal-to-noise ratio, the third parameter of the $i^{th}$ interference signal, and the effective signal-to-noise ratio, until i=N, wherein i is an integer, and an initial value of i is 1.

10. The apparatus according to claim 8, wherein the receiver algorithm is a symbol level interference cancellation algorithm or a maximum likelihood algorithm.

11. The apparatus according to claim 8, wherein the third parameter of the interference signal comprises one or a combination of the following: a transmission mode of the interference signal, a rank of the interference signal, a data-to-pilot power ratio of the interference signal, and a modulation scheme of the interference signal.

12. The apparatus according to claim 8, wherein the mapping relationship for correcting the effective signal-to-noise ratio is a mapping formula, and the processor is further configured to calculate the corrected signal-to-noise ratio using the mapping formula, wherein the first parameter and the effective signal-to-noise ratio are inputs of the mapping formula, and the corrected signal-to-noise ratio is an output of the mapping formula.

13. The apparatus according to claim 8, wherein the mapping relationship for correcting the effective signal-to-noise ratio is a mapping table, wherein the mapping table indicates the corrected signal-to-noise ratio corresponding to the first parameter and the effective signal-to-noise ratio, and the processor is further configured to obtain the corrected signal-to-noise ratio by using the mapping table.

14. The apparatus according to claim 8, wherein the interference signal is caused by a neighboring cell of a serving cell of the current user equipment, or is caused by another user equipment in the serving cell, wherein the another user equipment is user equipment paired with the current user equipment in the serving cell.

* * * * *